United States Patent [19]

Spector

[11] 4,162,153

[45] * Jul. 24, 1979

[54] HIGH NITROGEN AND PHOSPHOROUS CONTENT BIOMASS PRODUCED BY TREATMENT OF A BOD-CONTAINING MATERIAL

[75] Inventor: Marshall L. Spector, Allentown, Pa.

[73] Assignee: Air Products and Chemicals, Inc., Allentown, Pa.

[*] Notice: The portion of the term of this patent subsequent to Nov. 1, 1994, has been disclaimed.

[21] Appl. No.: 818,786

[22] Filed: Jul. 25, 1977

Related U.S. Application Data

[63] Continuation-in-part of Ser. No. 676,266, Apr. 12, 1976, Pat. No. 4,056,465.

[51] Int. Cl.² ............................................. C02C 1/06
[52] U.S. Cl. ............................... 71/12; 210/DIG. 28
[58] Field of Search ............................ 210/3–8, 210/14–16, DIG. 28; 71/12, 13

[56] References Cited

U.S. PATENT DOCUMENTS

| | | | |
|---|---|---|---|
| 3,764,523 | 10/1973 | Stankewich | 210/DIG. 28 |
| 3,939,068 | 2/1976 | Wendt et al. | 210/16 |
| 3,953,327 | 4/1976 | Parker | 210/16 |
| 3,964,998 | 6/1976 | Barnard | 210/16 |
| 3,994,802 | 11/1976 | Casey et al. | 210/5 |
| 4,056,465 | 11/1977 | Spector | 210/8 |

Primary Examiner—Thomas G. Wyse
Attorney, Agent, or Firm—Thomas G. Ryder; Barry Moyerman

[57] ABSTRACT

An organic product material having a high nitrogen and phosphorous content is produced as the product of a biological system for the treatment of a BOD-containing influent which also contains phosphorous and fixed nitrogen. The biological treatment system comprises the reaction of a mixed liquor composed of an activated biomass and a BOD-containing influent initially under anaerobic conditions and thereafter treating such mixed liquor under oxic conditions. The treated material is then separated into a supernatant liquid in which the BOD is depleted and a dense, activated biomass. A portion of this biomass is employed in forming the mixed liquor for the initial anaerobic treatment, while the remaining portion of the biomass is recovered as product. The living biomass product can be used in the fermentation industries. Alternatively, the product can be used as such or further processed, e.g. dried, for employment as a fertilizer or a nutrient in animal feeds.

17 Claims, 4 Drawing Figures

HIGH NITROGEN AND PHOSPHOROUS CONTENT BIOMASS PRODUCED BY TREATMENT OF A BOD-CONTAINING MATERIAL

RELATED APPLICATIONS

This application is a continuation-in-part of application Ser. No. 676,266, filed Apr. 12, 1976, U.S. Pat. No. 4,056,465.

BACKGROUND OF THE INVENTION

This invention relates to the conversion of carbonaceous phosphorous and nitrogen values in BOD-containing liquid into a plant or animal nutrient or a high energy biomass useful in the fermentation industries. More particularly, the product of this invention relates to high nutrient assay animal feeds produced from N-, P-, and BOD-containing mixtures, such as, for example, carbohydrate suspensions or solutions. This invention also relates to the production of high assay fertilizers by the treatment of BOD-containing wastewater. It also relates to an active, dense biomass useful in fermentation processes.

DESCRIPTION OF THE PRIOR ART

The employment of biological sludge for fertilizer values is known to the art and has been more or less successfully practiced (Miloganite fertilizer produced by the city of Milwaukee). Various other municipalities and wastewater treating enterprises have attempted to dispose of waste sludge for their compost or fertilizer values. Unfortunately, the fertilizer value of unsupplemented sludges heretofore employed has been minimal due to the fact that the phosphorous content, expressed as elemental phosphorous, has varied from about 1 to about 2% by weight. (See C. J. Rehling and E. Truog "Activated Sludge-Milorganite; Constituents, Elements and Growth Producing Substances, " I and E Chemistry, Analytical Edition, Volume 11, No. 5, Pages 281 to 283).

SUMMARY OF THE INVENTION

In accordance with this invention the product which can be employed as an animal nutrient (e.g., poultry, fish or crustacean feed), as a plant nutrient (fertilizer), or applied to fermentation processes, is produced by first forming a mixed liquor by mixing activated biomass with a food source in the form of a BOD-containing liquid under anaerobic conditions, i.e. substantially free of $NO_x$ having a having a concentration of less than 0.7 ppm dissolved oxygen (DO). Preferably, the DO content is less than 0.5 ppm with a DO content of less than 0.4 ppm being common. It is important to maintain the DO content in the anaerobic zone below the specified limit throughout the entire zone and for the total treatment period. Isolated portions of the anaerobic zone at higher DO levels are to be avoided. Similarly, intermittent time periods of higher DO are also to be avoided. It is through the operation of this initial anaerobic treatment that the formation of a nonfilamentous biomass is effected. In fact, formation of the nonfilamentous biomass is indicative of the maintenance of the anaerobic conditions, i.e. low DO. Conversely, the formation of a filamentous biomass is indicative of a failure to maintain anaerobic conditions. This is particularly so in the earlier portions of the anaerobic operation.

When operating in a continuous flow mode, the formation of the particular microorganism (capable of sorbing BOD under anaerobic conditions), in preference to other types of microorganism requires the maintenance of anaerobic conditions in the initial zone in order to develop. The occurrence of isolated zones of higher DO or the maintenance of a higher DO in the zone for an intermittent period adversely affects the development of such microorganisms. After establishment of the desired microorganism through the maintenance of anaerobic conditions, slightly higher DO levels can be tolerated for short periods of time, but if conditions of higher DO level are permitted to prevail for any significant period of time, the effect is deleterious in that the desired microorganisms are washed out and replaced by ordinary biomass.

The food source must also contain nitrogen, phosphorous and potassium values in adequate quantities relative to BOD concentration to stoichiometrically produce the desired concentrations of these elements in the product. For this purpose, it can be estimated that from about 30 to about 100% of the BOD removed is converted to product. Usually, the phosphorous content is at least about 2% by weight (expressed as elemental phosphorous), the potassium content (expressed as elemental potassium) is at least about 1% by weight, and the nitrogen content (expressed as elemental nitrogen) is at least about 5% by weight of dried product. The food source, of course, will also contain (albeit at times only in trace quantities) other elements normally required to sustain life, including sulfur, magnesium, zinc, calcium, manganese, copper and others. The full list of these elements is believed to be known in the art and, in addition to those specifically mentioned above, also encompasses carbon, hydrogen, oxygen, iron and sodium. (A list of these elements can be found in "Botany—A Functional Approach," Third Edition, by W. H. Muller, Macmillan Publishing Co., Inc., N.Y.) Generally, these elements are found in adequate supply in ground water.

The activated biomass employed in this step is the same biomass produced later in this process and it is the employment of such biomass which is effective for the selective production of nonfilamentous microorganisms capable of sorbing substantial quantities of BOD under anaerobic conditions. It is theorized that the energy for active transport of BOD values from aqueous solution to within cell walls is derived from hydrolysis of polyphosphates stored either within or at cell walls and inorganic phosphate is transferred from the biomass to the aqueous phase at the same time. It is believed that the initial exposure of this particular biomass to BOD-containing solutions under anaerobic conditions favors proliferation of species most capable of storing polyphosphates since these species are particularly able to sorb the available food under anaerobic conditions.

The mixed liquor from the anaerobic treatment is subsequently contacted with oxygen-containing gas under conditions selected to maintain a dissolved oxygen content of at least about 1 ppm. This contacting is effective to oxidize the BOD previously sorbed by the biomass in the mixed liquor, thereby substantially lowering the internal BOD content and generating energy. During this oxic or aerobic treatment, the energy expended by hydrolysis of polyphosphates in the anaerobic treatment is recouped and polyphosphate is reformed and accumulated within the biomass, thereby removing phosphate values from the aqueous portion of the mixed liquor. This oxidized mixed liquor is then separated into a supernatant liquid and a more dense biomass. At least a portion of this separated biomass is employed as the activated biomass in the initial anaerobic mixing with BOD-containing liquor. Another portion (usually the balance) of the separated biomass is recovered as the product. In those cases where animal or plant nutrient is to be produced, the dense biomass can be subjected to drying and/or pasteurizing procedures in order to convert it into a form more convenient for handling and safe for application. However, it may at times be preferable to add live, wet biomass to the soil thus avoiding drying costs. Another approach would be to mix seeds with live biomass at time of planting. The live biomass produced in this process has properties of unusually high density, due to massive polyphosphate inclusion, and the ability to remain viable for long periods of time due to the energy contained in the polyphosphate. These properties obviously make the product of this invention well suited to applications in the fermentation industries.

In accordance with another embodiment, particularly suited to wastewater treatment in which denitrification is desired, a portion of the mixed liquor, subsequent to the oxic or aerobic treatment, can be recycled to an anoxic zone interposed between the anaerobic and the oxic treatments under anoxic conditions for the purpose of denitrification of nitrites and/or nitrates produced by the oxidation of ammonia in the oxic treatment. As used herein, the term anoxic indicates conditions wherein the dissolved oxygen content of the mixed liquor is maintained at a level not in excess of 0.7 ppm (preferably less than 0.5 ppm and particularly less than 0.4 ppm) and wherein nitrates and/or nitrites are added to the initial section of the anoxic treatment. As with the anaerobic treatment, it is also important in the anoxic treatment that the DO content in the anoxic zone be maintained below the specified limit throughout the entire zone and for the total treatment period. Isolated portions of higher DO levels or intermittent time periods of higher DO level are to be avoided, but in this case the penalty is a loss of denitrification as distinguished from loss of good sludge properties when excessive DO is present in the anaerobic zone. In fact, as a general rule, it can be stated that in the anaerobic and anoxic treatments, an oxygen containing gas is not intentionally fed to such treatments. As distinguished from this, oxygen containing gas is intentionally introduced into the oxic or aerobic treatment.

The concentration of total nitrates and/or nitrites in the mixed liquor recycled back to the anoxic treatment is normally in excess of 2 ppm, expressed as elemental nitrogen. The nitrates and/or nitrites are reduced in the anoxic treatment to elemental nitrogen gas. The nitrates and/or nitrites added to the anoxic zone are obtained by recycling back to the anoxic treatment, oxygenated mixed liquor obtained from the oxic or aerobic treatment. This mode of operating provides a means for reducing the nitrogen content of the effluent liquor when the product is derived from treatment of BOD-containing wastewater.

It will be understood that the product of this invention can be produced either by a batch process or by a continuous flow process. Thus, when operating as a continuous flow process, it is within the scope of this invention to have an initial anaerobic contacting zone wherein BOD-containing influent is mixed with recycle biomass under anaerobic conditions to produce the mixed liquor and to sorb BOD from the aqueous phase. The mixed liquor from the initial anaerobic zone can then be passed to a subsequent oxic or aerobic zone wherein it is treated under oxic conditions. The material from the oxic zone can then be passed to a settling zone (or clarifier) wherein the more dense biomass is settled from the supernatant liquid. A portion of the biomass is removed from the settling zone and recovered as product, while another portion of the settled biomass is recycled to the initial anaerobic zone.

When the intermediate anoxic treatment is employed, an anoxic zone can be positioned intermediate the anaerobic and oxic zones and connected into the system such that the effluent mixed liquor from the anaerobic zone passes to the anoxic zone, the treated mixed liquor from the anoxic zone passes to the oxic zone and a portion of the oxygenated mixed liquor from the oxic zone is recycled to back the anoxic zone.

When operating as a batch process, a BOD-containing aqueous solution is mixed with an activated biomass obtained from a previous cycle to form the mixed liquor which is then treated initially under anaerobic conditions.

Subsequent to the anerobic treatment, the mixed liquor is then treated in the same vessel but under oxic conditions. The material, after oxic treatment, is then separated into a supernatant clear liquid and a more dense biomass phase and at least a portion of the biomass phase recovered as product.

The particular product produced by the processing steps described above has a comparatively high phosphorus content. This is particularly so, for example, when a comparison is made between the phosphorus values typically obtained in wastewater sludge versus the elemental phosphorus content typically obtained when wastewater is employed as the BOD containing influent for the product of this invention. Thus, as mentioned before, typical assays of more traditional wastewater sludges have a phosphorus content in the range of from about 1 to about 2% by weight (expressed as phosphorous) while assays of from about 5 to about 10% by weight phosphorous on the same basis (dry) have been obtained in accordance with this invention. This high assay is due to the fact that the process employed for the production of the product herein is capable of removing all of the soluble and hydrolyzable phosphate in the influent by incorporation into the biologically active species employed as the biomass herein. It is to be emphasized that these high phosphate values are produced by incorporation of soluble and hydrolyzable phosphate from the BOD influent into the biomass and, as such, is incorporated at and/or within the cell walls of the biota, largely as massive inclusions of polyphosphate. The presence of inorganic polyphosphates in biology is a widespread, but little understood phenomenon (see "Inorganic Polyphosphates in Biology: Structure, Metabolism and Function," F. M. Harold, Bacteriological Reviews, Volume 30 (4); pages 772–794, 1966) but the technique of intentionally inducing large concentrations of polyphosphate in biomass utilized in the treatment of BOD-containing solutions has heretofore not been employed.

Additionally, the product of this invention generally has a nitrogen assay which is significantly higher, i.e. from 6 to about 8 weight percent expressed as elemental nitrogen on a dry basis, as contrasted to nitrogen assays of less than about 5% and going down to about 3% commonly reported for wastewater sludges of the prior art. Similarly, the potassium assay of the product of this invention can also be comparatively high, i.e. in the range of greater than about 1% expressed as $K_2O$, as contrasted to values of about 1% or less reported for fertilizers produced from wastewater treatment plants such as, for example, Milorganite.

The particularly high phosphorus values for the product produced in accordance with this invention is due to the substantially complete incorporation of phosphorus values from the BOD containing influent to the biomass. In this connection, it is noted that the phosphorus content of the biomass is a function of the mass of the phosphorus available to the system and the mass of the biomass produced. As will be seen in the subsequent examples, phosphorus, expressed as weight percent P, ranges upwardly from about 5% by weight and can conceivably be higher, for example, up to about 20% by weight or more in the instance of a high phosphate to BOD ratio in the influent food source.

The wet biomass product of this invention is believed to be unusual. This is particularly so when producing fertilizer from wastewater, since there is little or no tendency for the biomass or sludge of this invention to have an unpleasant odor during the drying process. It is hypothesized, without being bound thereby, that energy released from the high polyphosphate content of the biomass is responsible for maintaining life within the biomass until the final act of pasteurization. Thus, decay or rotting of dead biomass is largely avoided. This theory is supported by microscopic examinations of the biomass which indicate that phosphorus is stored as massive inclusions within the cell walls.

When the biomass product of this invention is employed as a fertilizer, the phosphorus in the biomass is available to plant life as is the fixed nitrogen. Due to the fact that the nitrogen is combined largely as protein and the phosphorus is combined largely as polyphosphate, it can be seen that the fertilizer product of this invention is of particular value since the constituents can be expected to be of the slow release variety.

For the case of animal or fish feed, the BOD content of the influent can be carbohydrates such as glucose, sucrose, starch or waste liquor from pulp and paper operations. The BOD-containing food will, of course, also contain the inorganic materials mentioned previously.

Further, the live biomass product of this invention has utility in the fermentation industries due to its high density (for facile separation) and energy content.

Figure 1:
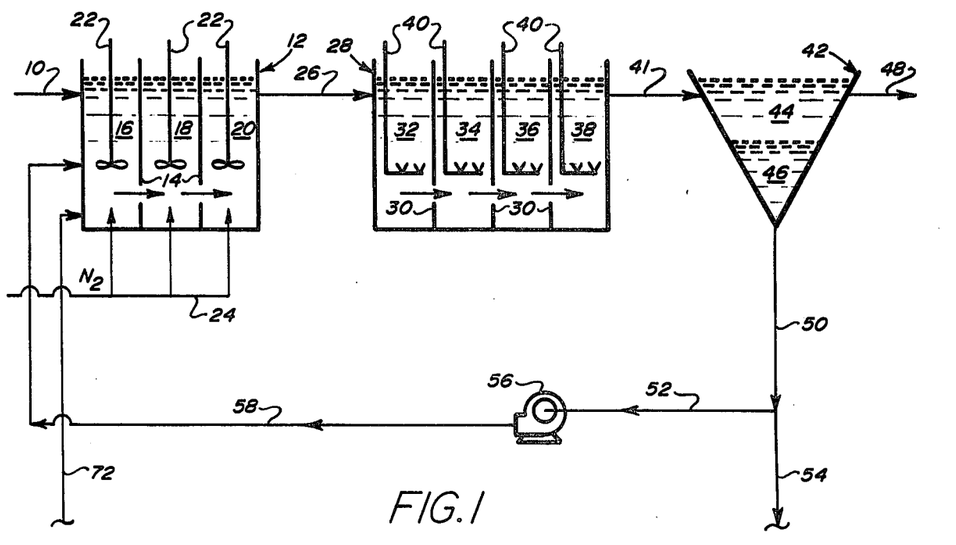
FIG. 1 is a schematic diagram of a continuous flow process in accordance with this invention employing anaerobic and oxic zones.

Referring to FIG. 1 of the drawings, an activated sludge wastewater treating facility is shown. Incoming wastewater for treatment, either settled sewage from a primary sedimentation tank or otherwise, is introduced via inlet line 10 into tank 12 which defines an anaerobic zone. As shown in FIG. 1, partitions 14 located within tank 12 divide the zone into a series of interconnected hydraulic stages 16, 18 and 20 designed to provide staged flow through the zone defined by tank 12. Each of the hydraulic stages is provided with stirring means 22. While FIG. 1 illustrates the division of tank 12 into three stages each containing a stirring means, it will be understood that a greater or lesser number of stages can be employed.

While various techniques can be employed in order to maintain the zone defined by tank 12 under anaerobic conditions, such as, for example, by covering the tank, and/or providing a blanket of carbon dioxide, nitrogen, or other inert gas, the particular technique illustrated in FIG. 1 is the use of nitrogen purge gas admitted into and bubbled up through the mixed liquor. Shown specifically, is line 24 which introduces nitrogen into each of the stages 16, 18 and 20 through the bottom of tank 12. It is through this technique that anaerobic conditions including a DO content of less than 0.7 ppm are maintained. A $NO_x$ content of less than 0.3 ppm, and preferably less than 0.2 ppm is maintained by other means.

The anaerobically treated mixed liquor is passed by means of line 26 and introduced into tank 28 wherein the mixed liquor is treated under oxic conditions. As illustrated in this figure, three partitions 30 are employed to separate the zone defined by tank 28 into four serially, interconnected hydraulic stages 32, 34, 36 and 38. Aeration of the liquid in tank 28 is effected by the sparging of air to the bottom of each hydraulic stage of tank 28 by means of spargers 40. In the operation of this zone the dissolved oxygen content is maintained above about 1 ppm in order to insure adequate oxygen presence for the metabolism of BOD and to furnish the energy for phosphate uptake by the biomass. Alternatively, oxygen or oxygen enriched air can be introduced via spargers 40. When employing oxygen, oxygen enriched air or gas containing oxygen of any desired purity, suitable means for covering all or a part of the aerobic or oxic zone can be considered. If desired, instead of, or in addition to spargers, the oxygenated zone can be provided with mechanical aerators.

As shown in FIG. 1, tank 28 is partitioned into four hydraulic stages, although a greater or lesser number of stages can be employed, if desired. It is preferred, however, that several stages be employed since it has been observed that phosphate uptake by the biomass is a first order reaction with respect to soluble phosphate concentration. Accordingly, low values of phosphate in the liquid effluent and, accordingly, high values of phosphate in the biomass are most economically obtained with staged flow configuration.

Subsequent to the oxic treatment in tank 28, the treated mixed liquor is passed by means of line 41 into clarifier 42 wherein it is permitted to separate into a supernatant, clear liquid 44 and a more dense biomass 46. The supernatant liquid 44 is withdrawn from clarifier 42 by means of line 48 and removed from the system.

The more dense biomass 46 is removed from the bottom of clarifier 42 by means of line 50 and the stream of line 50 is divided into streams of line 52 and line 54. As shown in FIG. 1, the stream of line 52 is recycled by means of pump 56 and line 58, and is returned to the first stage 16 of tank 12 to treat BOD-containing influend under anaerobic conditions.

Figure 2:
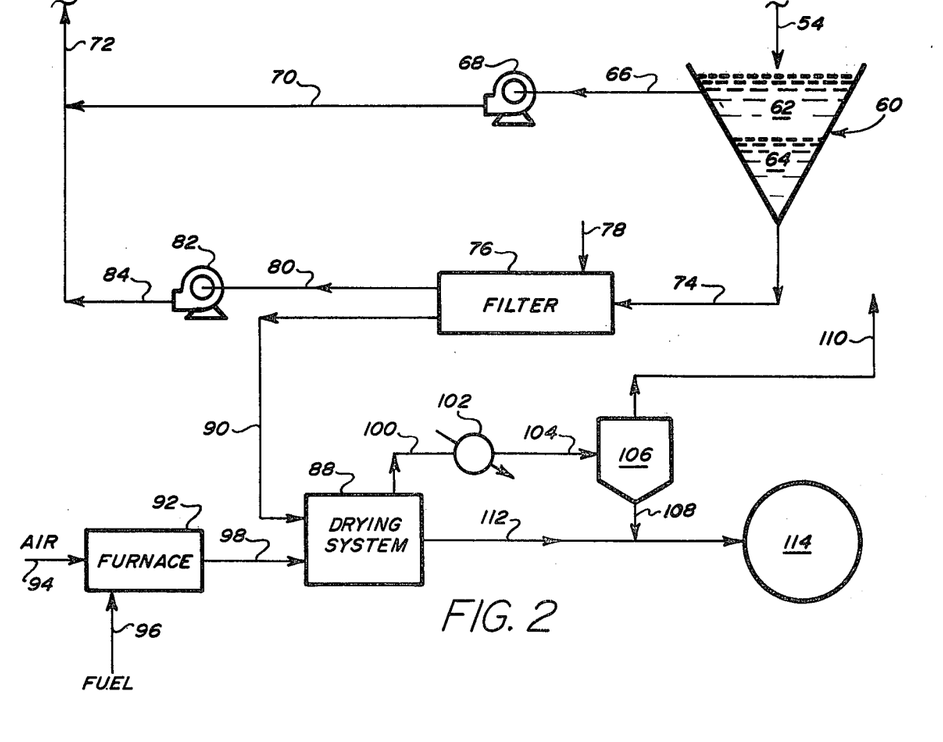
FIG. 2 is a schematic diagram showing processing of biomass obtained from a continuous flow process.

Referring now to FIG. 2, there is shown the further processing of the biomass contained in the stream of line 54. This portion of the biomass from clarifier 42 of FIG.

1 is introduced into thickener 60 where a further separation into a second supernatant liquid phase 62 and a second more dense biomass phase 64, is effected. The second supernatant liquid phase 62 is removed from thickener 60 by means of line 66 and recycled via pump 68, line 70, and line 72 into tank 12 of FIG. 1.

The second more dense biomass phase 64 is removed from the thickener 60 by means of line 74 and is introduced into filter 76 to effect further separation between liquid and solids. A centrifuge, filter press or other known apparatus for the separation of liquids and solids can be used instead of filter 76. If desired, filter aid chemicals can also be added to filter 76 by means of line 78. The liquid separated in filter 76 is removed via line 80, pump 82 and passed by means of line 84 into line 72 wherein it is combined with the second supernatant liquid of line 70 and returned to anaerobic tank 12 as shown in FIG. 1. The solids separated in filter 76 are passed to a drying system 88 as indicated by line 90.

As shown in FIG. 2, air and fuel are introduced into furnace 92 by means of lines 94 and 96, respectively. The hot gases from furnace 92 are passed by means of line 98 into drying system 88 wherein the hot gases are employed to effect a final drying and sterilization of the solid biomass product.

The gas from drying system 88 is removed therefrom by means of line 100 and passed to heat exchanger 102 for the recovery of heat values therefrom. The cooled, gaseous stream is then passed from heat exchanger 102 by means of line 104 to cyclone separator 106 wherein any solid fines are removed from the gaseous stream and are transported from the cyclone 106 by means of line 108. The substantially solid-free gas is exhausted from cyclone separator 106 and the system by means of line 110.

The separated solid biomass product is removed from drying system 88 by means of line 112 and passed to product storage facility 114. As shown in FIG. 2, the solid fines removed from the gaseous stream in separator 106 are introduced into line 112 by means of line 108.

Figures 3, 4:
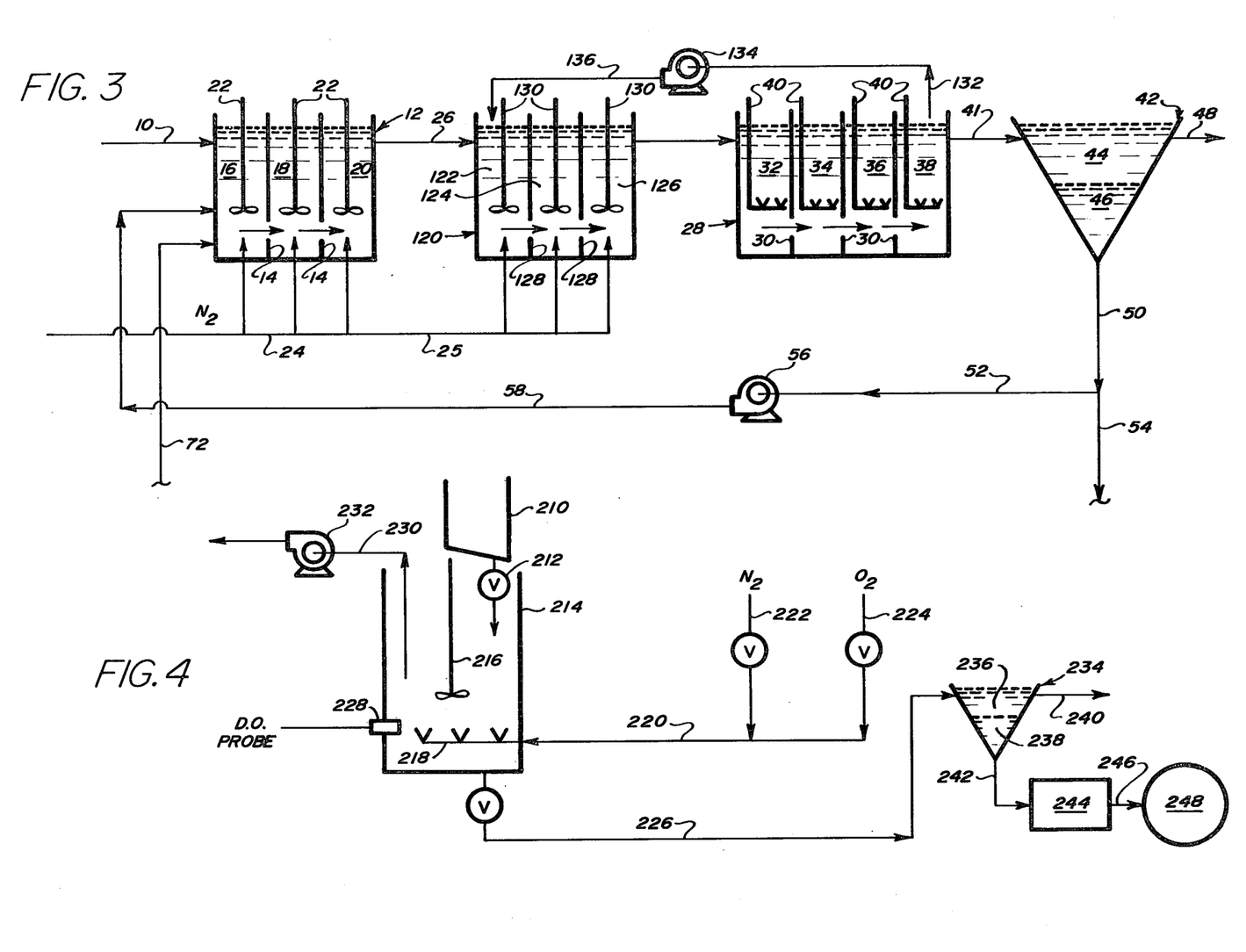
FIG. 3 is a schematic diagram showing a continuous flow process employing anaerobic, anoxic, and oxic zones.
FIG. 4 is a schematic diagram illustrating batch process operation of this invention.

FIG. 3 shows a schematic diagram of a continuous flow process in which an anoxic zone is interposed between the anaerobic zone (tank 12) and the oxic zone (tank 28) of the scheme shown in FIG. 1. Accordingly, then, the same items in both FIG. 1 and FIG. 3 will be designated by the same reference numerals. Thus, in FIG. 3 incoming wastewater is shown being introduced via inlet line 10 into tank 12, which defines the anaerobic zone. Similarly, the treated wastewater is separated in clarifier 42 into a first supernatant liquid layer 44 and more dense biomass phase 46, which is removed from clarifier 42 by means of line 50 and then divided into the streams of lines 52 and 54. As shown in FIG. 2, the stream of line 54 is introduced into thickener 60 and the liquid separated in thickener 60 and filter 76 is returned via line 72 to tank 12 (again, as shown in both FIGS. 1 and 3).

In the specific flow scheme shown in FIG. 3, the anaerobically treated waste water is removed from tank 12 by means of line 26 and introduced into tank 120, which defines an anoxic treating zone. As illustrated in FIG. 3, tank 120 is partitioned into three serially, interconnected hydraulic stages 122, 124 and 126 by means of two partitions 128.

While various techniques can be employed in order to maintain the zone defined by tank 120 under anoxic conditions such as, for example, covering the tank and providing it with a blanket of carbon dioxide, nitrogen, or other inert gas, the particular technique illustrated in FIG. 3 is the use of nitrogen gas admitted into and bubbled up through the mixed liquor. Shown specifically is line 25 (an extension of line 24) which introduces nitrogen into each of the stages 122, 124 and 126 through the bottom of tank 120. It is through this technique that the DO content of the mixed liquor in tank 120 is maintained at less than 0.7 ppm. Each of the stages 122, 124 and 126 is also provided with stirring means 130 to insure adequate mixing of the materials in tank 120.

Also shown in FIG. 3 is an internal recycle circuit comprised of line 132, pump 134, and line 136. As illustrated in this figure, oxygenated mixed liquor is removed from the last hydraulic stage 38 of tank 28 by means of line 132 and is recycled through pump 134 and line 136 to the first hydraulic stage 122 of the anoxic zone in tank 120. It is by this means that $NO_x$ containing materials in the form of nitrites and/or nitrates are introduced into the anoxic zone.

In all other respects, the wastewater treatment system of FIG. 3 parallels the wastewater treatment system shown in FIG. 1, but results in a supernatant liquid 44 removed from clarifier 42 by means of line 48 which has a reduced nitrogen content.

FIG. 4 illustrates a batch process operation for the production of biomass product in accordance with this invention. In this figure, inlet hopper 210 is provided with a valve 212, designed to permit a measured quantity of a BOD-containing food source to enter reaction tank 214. A stirring means 216 is provided in tank 214 in order to provide adequate mixing of the contents of tank 214. Located near the bottom of tank 214 is a gas sparger 218 which in turn is connected to an external inlet gas manifold 220. As is also shown in this figure, valved nitrogen inlet line 222 and valved oxygen inlet line 224 connect to gas manifold 220.

Located at the bottom of tank 214 is a valved biomass removal line 226. Tank 214 is also provided with a dissolved oxygen probe 228 which is capable of detecting and indicating the dissolved oxygen content of the material within tank 214. Finally, tank 214 is provided with a liquid removal or outlet system comprising conduit 230 having its inlet end positioned a pre-determined distance above the bottom of tank 214 and connected at its other end to pump 232.

In operation a pre-determined quantity of BOD-containing food source is introduced from tank 210 into tank 214 through the operation of valve 212. Stirring means 216 operates to effect thorough mixing of the BOD-containing influent and previously prepared activated biomass in tank 214 in order to provide a mixed liquor. Dissolved oxygen probe 228 detects the DO level in the mixed liquor in order that proper control thereof can be maintained. Thus, during the initial anaerobic treating phase, valved nitrogen inlet line 222 introduces nitrogen into gas manifold 220 which in turn is connected to gas sparger 218; whereby nitrogen gas can be bubbled upwardly through the mixed liquor in tank 214. This is effective to maintain the dissolved oxygen content below the desired level. If the DO level is too high, this is detected by DO probe 228 and the rate of nitrogen introduction can be increased.

Upon termination of the anaerobic treating phase, the introduction of nitrogen through nitrogen inlet line 222 is discontinued and oxygen, either in the form of pure oxygen, air or oxygen enriched air, is then introduced via valved oxygen inlet line 224 through gas manifold 220 and into sparger 218; whereby oxygen is bubbled upwardly through the mixed liquor in tank 214. At the termination of the oxic or aerobic treating phase, the introduction of oxygen containing gas through inlet line 224 is discontinued.

After the introduction of oxygen has been discontinued, the mixed liquor in tank 214 is permitted to remain at rest in order to affect separation of a supernatant liquid phase from a more dense biomass phase. After such settling has taken place, pump 232 is activated in order to withdraw supernatant liquid from tank 214 by means of outlet conduit 230. Valved biomass outlet line 226 is then opened in order to remove a portion of the more dense biomass phase from the bottom of tank 214. The remaining portion of the biomass phase is retained in tank 214 for mixture with the next batch of influent BOD-containing food source.

The portion of the biomass phase removed via valved outlet line 226 is introduced into thickener 234 in order to permit a second, more complete, separation into a second supernatant liquid phase 236 and a more dense biomass phase 238. The supernatant liquid phase is removed from the system by means of conduit 240, while the biomass phase is passed by means of conduit 242 to drying zone 244 wherein substantially all water is removed. Final dried biomass product is transported from zone 244 by means of line 246 to product storage 248.

In order to illustrate this invention in greater detail, reference is made to the following examples.

Example 1

In this example, the procedure employed to produce the nutrient material of this invention suitable for use as a fertilizer comprised an initial anaerobic treatment followed by a subsequent oxic or aerobic treatment. The apparatus employed comprised an anaerobic zone partitioned into five hydraulic stages each having a volume of 1.2 liter, and each being provided with a stirring means. The initial zone was maintained under anaerobic conditions by nitrogen sparging, whereby the measured DO content throughout the run was maintained at all times below 0.15 ppm. The oxic or aerobic zone was also partitioned into five equal hydraulic stages each having a volume of 3 liters. Each of these oxic stages was maintained under oxic conditions by sparging with air, and the DO content in all the stages remained above 1.8 ppm throughout this run. A clarifier or settling tank was also provided to receive effluent from the oxic zone. In the clarifier, a separation is effected between a supernatent, clear liquid and a more dense activated biomass (sludge). The supernatant liquid was decanted and removed from the system, while the biomass was removed from the bottom of the clarifier and separated into two portions. One portion was removed from the system and recovered as product, while the other portion of the separated sludge was pumped back to the initial stage of the anaerobic zone.

The BOD containing food source employed in this example was a municipal wastewater of high phosphorous content. Inspection data for the influent are shown in Table I below. The influent was charged to the system at a rate so as to provide an influent detention time (IDT) of 3.66 hours, and the portion of the separated sludge which was returned to the initial anaerobic zone was recycled at a rate of about 18% by volume based upon influent flow rate. This was effective to provide a nominal residence time (NRT) of 0.176 hours per stage in the anaerobic zone, and 0.442 hours per stage in the oxic zone.

The portion of the sludge or active biomass not recycled to the initial anaerobic zone was separated from supernatent liquid, filtered and dried for 24 hours at 105° C. The inspection data for this dried product of the inventions, together with other inspection data of the separated supernatent liquid are also shown in Table I.

TABLE I

|  | Total BOD$_5$ (mg/l) | Soluble BOD$_5$ (mg/l) | NH$_3$—N (mg/l) | NO$_x$—N (mg/l) | PO$_4$—P (mg/l) |
|---|---|---|---|---|---|
| Influent (liquid) | 236 | 197 | 24 | 0.03 | 17.4 |
| Effluent (liquid) | 8.1 | 1.6 | 4.4 | 5.1 | 0.1 |
| Nutrient (dry solid) | C | H | N | P | S | Si |
| % by wt. | 28.42 | 5.71 | 5.46 | 6.81 | 0.48 | 0.60 |

From the data shown in Table I it can be seen that the specific process employed to produce the products of this invention is effective to provide a nutrient material having relatively high nitrogen and phosophorous content. It will also be seen that such product is produced while converting substantial quantities of the ammonia content of the influent into the more acceptable nitrite and/or nitrate form and that the process also effects substantially total removal of phosphate from the influent. Which phosphate value is recovered in the dry, solid product.

Example 2

In this example, the product produced was a nutrient material suitable for use as an animal feed. The procedure employed to obtain such products comprise the use of initial anaerobic treatment followed by an anoxic treatment and ultimately anoxic or aerobic treatment. The particular apparatus employed comprised an anaerobic zone partitioned into three hydraulic stages, each having a volume of 1.2 liter and each being provided with a stirring means. This initial anaerobic zone was maintained under anaerobic conditions by nitrogen sparging, whereby the measured DO content throughout the run was maintained below 0.1 ppm. The anoxic zone was also partitioned into three equal hydraulic stages each having a volume of 1.2 liter. Each of these stages was maintained under anoxic conditions by a nitrogen purge and the DO content in all of the anoxic stages remained below 0.1 ppm throughout the run. The oxic or aerobic zone was partitioned into four equal hydraulic stages each having a volume of 2 liters. Each of the oxic stages was maintained under oxic conditions by sparging with a mixture of nitrogen and air so as to provide an oxygen content in the sparged gas of about 18% oxygen. The DO content in all of these stages remained above 1.75 ppm throughout the run.

As in the apparatus of Example 1, a clarifier or settling tank was also provided to receive effluent from the oxic zone. Again, in the clarifier a separation was effected between a supernatent, clear liquid and a more dense activated biomass. Means were provided for decanting the supernatent liquid and removing it from the system while other means were provided for removing biomass from the bottom of the clarifier. This biomass was separated into two portions, one of which was removed from the system and recovered as product, while the other portion of biomass was pumped back to the initial stage of the anaerobic zone.

The apparatus employed in this example also contains an internal recycle circuit comprising conduits and a pump and operating so as to remove mixed liquor from the last stage of the oxic zone and recycle it to the first stage of the anoxic zone.

The BOD containing food source employed in this example was a glucose solution. Inspection data for the influent are shown in Table II below. The influent was charged to the anaerobic zone at a rate so as to provide an influent detention time (IDT) of 3.16 hours for the entire 3 zone system, and the portion of the separated sludge which was returned to the initial anaerobic zone was recycled at the rate of 30% by volume based upon influent flow rate. The portion of the mixed liquor forming the last stage of the oxic zone was returned to the initial stage of the anoxic zone at a recycle rate of 239% by volume based upon influent flow rate. This was effective to provide a nominal residence time (NRT) of 0.192 hours per stage in the anaerobic zone, 0.074 hours per stage in the anoxic zone and 0.123 hours per stage in the oxic zone.

The portion of the active biomass not recycled to the initial anaerobic zone was separated from supernatent liquid, filtered and dried for 24 hours at 105° C. The inspection data for this dried product of the invention, together with other inspection data of the separated supernatent liquid are also shown in Table II.

TABLE II

| | Total BOD$_5$ (mg/l) | Soluble BOD$_5$ (mg/l) | NH$_3$—N (mg/l) | NO$_x$—N (mg/l) | PO$_4^=$—P (mg/l) | | |
|---|---|---|---|---|---|---|---|
| Influent (liquid) | 219 | 219 | 22 | 2.3 | 8.9 | | |
| Effluent (liquid) | 3.2 | 1.4 | 4.6 | 1.3 | 1.0 | | |
| Nutrient | C | H | N | P | S | Si | K | Mg |
| % by weight | 39.57 | 5.97 | 8.40 | 5.95 | 0.06 | 0.4 | 1.94 | 1.43 |

The data shown in Table II above demonstrates the production of a nutrient suitable for use as an animal feed which was produced from a pure carbohydrate feedstock. As can be seen, the product has a high nitrogen, phosphorous and potassium assay and, additionally, contains a significant quantity of magnesium (another element essential to life). Further these essential values are present along with high carbon and hydrogen content, thus making it of a type generally suitable for the nourishment of animal life.

EXAMPLE 3

The product material produced in this example is useful as an activated biomass in fermentation operations. The particular procedure employed was a batch process as distinguished from the continuous flow operations illustrated in Examples 1 and 2. The particular equipment employed was similar to that described in FIG. 3 of the drawings.

In this example, a measured quantity of a nitrogen-, phosphorous-, and BOD- containing food source was introduced into a reaction tank. During the initial treating phase anaerobic conditions were maintained within the tank by introducing nitrogen through the sparger located at the bottom of the tank. The measured DO content thrughout this anaerobic phase was maintained at substantially zero. The nitrogen sparging was then discontinued and the treatment was continued in a second, anaerobic or oxic treating phase. The oxic conditions were maintained by means of oxygen sparging. The DO content maintained during the oxic phase was 5.0.

The BOD containing food source employed in this example was a municipal wastewater. Inspection data for the influent are shown in Table III below. The influent was retained in the system so as to provide an overall influent detention time (IDT) of 1.5 hours with a nominal residence time (NRT) of 0.5 hours during the anaerobic phase and 1.0 hours during the oxic phase. The portion of separated sludge which was retained from this example for use during the initial anaerobic phase of the next batch and which was retained for use in the initial anaerobic phase of this batch from a preceding batch was 50% by volume based upon the total influent charged.

The portion of the sludge or active biomass not retained for use in the initial anaerobic phase of a subsequent batch operation was withdrawn from the tank, filtered and dried for 24 hours at 105° C. The inspection data for this dried product together with other inspection data of the separated supernatant liquid are shown in Table III.

TABLE III

| | Total BOD$_5$ (mg/l) | Soluble BOD$_5$ (mg/l) | NH$_3$—N (mg/l) | PO$_4^=$—P (mg/l) | | |
|---|---|---|---|---|---|---|
| Influent (liquid) | 153 | 126 | 16.77 | 3.62 | | |
| Effluent (liquid) | 6.3 | 2.1 | 7.89 | 0.48 | | |
| Nutrient | C | H | N | P | S | Si | K | Mg |
| % by weight | 39.13 | 5.62 | 7.1 | 3.96 | 0.88 | 1.95 | 1.01 | 0.71 |

The above data show the production of a high nitrogen and phosphorous content product employing a batch operation process. It will also be noticed that the product has a relatively high N&P assay even though the corresponding nitrogen and phosphorous values in the influent are relatively low.

What is claimed is:

1. An improved high nitrogen-, and phosphorus-content biomass characterized by a phosphorous content of at least about 3.96% and produced by the operation of an activated sludge process which inhibits proliferation of filamentous biomass, said process consisting essentially of:
   (a) first forming a mixed liquor by mixing activated biomass with nitrogen-, phosphorus-, and BOD-containting influent and initially treating the mixed liquor under anaerobic conditions such as to be substantially free of NO$_x^-$ and to have a dissolved oxygen content of less than 0.7 ppm; thereby effecting selective production of nonfilamentous microorganisms capable of sorbing BOD under anaerobic conditions, whereby said mocroorganisms effect a decrease in BOD content of said mixed liquor;
(b) oxidizing BOD in the mixed liquor to cause removal of BOD by contact with oxygen containing gas under conditions selected to maintain a dissolved oxygen content of at least 1 ppm;
(c) settling the oxidized mixed liquor so as to separate a supernatant liquid from a more dense biomass;
(d) employing a portion of the separated biomass as the activated biomass in an initial mixing with BOD-containing influent; and
(e) recovering another portion of the settled and separated biomass as product.

2. The biomass product of claim 1 wherein the anaerobic conditions are selected so as to have a dissolved oxygen concentration of less than about 0.5 ppm.

3. The biomass product of claim 1 wherein the anaerobic conditions are maintained by contacting the mixed liquor with nitrogen gas.

4. The biomass product of claim 1 wherein the product is to be employed as a plant or animal nutrient and the BOD-containing influent is wastewater.

5. The biomass product of claim 1 wherein the influent also contains ammonia values and wherein the mixed liquor, subsequent to the anaerobic treatment and prior to the oxidizing treatment, is treated under anoxic conditions including a dissolved oxygen content not in excess of 0.7 ppm and wherein oxidized mixed liquor having a concentration of nitrates and/or nitrites in excess of about 2 ppm, expressed as elemental nitrogen, is admixed during the anoxic treatment.

6. The biomass product of claim 5 wherein the oxidized mixed liquor added to the anoxic treatment is added in a quantity corresponding to from 100 to about 400% by volume based upon the fresh influent employed in the initial anaerobic treatment.

7. The biomass product of claim 5 wherein the activated biomass feed to the anaerobic treatment is admixed with the influent in a quantity corresponding from about 10 to about 50% by volume of the influent.

8. The biomass product of claim 4 wherein the total treating time under anaerobic conditions and under oxidizing conditions does not exceed about 3 hours.

9. The biomass product of claim 5 wherein the total treating time under anaerobic conditions, anoxic conditions and oxidizing conditions does not exceed about 3 hours.

10. The biomass product of claim 1 wherein the product is to be employed as a live micro-organism in fermentation and steps (a) through (e) are performed in a batch-type process.

11. The biomass product of claim 1 wherein the process steps are performed in a continuous flow process in separate zones and the portion of separated biomass employed as the activated biomass is recycled to the initial anaerobic zone.

12. The biomass product of claim 5 wherein the process steps are performed in a continuous flow process in separate zones, the portion of separated biomass employed as the activated biomass is recycled to the initial anaerobic zone, and oxidized mixed liquor from the oxic zone is recycled to the anoxic zone.

13. The biomass product of claim 11 wherein the oxic zone comprises a series of at least two hydraulically distinct sections in sequential liquid flow communication.

14. The biomass product of claim 12 wherein the oxic zone comprises a series of at least two hydraulically distinct sections in sequential liquid flow communication.

15. The biomass product of claim 1 wherein the BOD-containing influent is a carbohydrate solution or suspension.

16. The biomass product of claim 11 wherein the anaerobic zone comprises a series of at least two hydraulically distinct sections in sequential flow communication.

17. The biomass product of claim 12 wherein the anaerobic zone comprises a series of at least two hydraulically distinct sections in sequential flow communication.

* * * * *

UNITED STATES PATENT AND TRADEMARK OFFICE
CERTIFICATE OF CORRECTION

PATENT NO. : 4,162,153
DATED : July 24, 1979
INVENTOR(S) : Marshall L. Spector

It is certified that error appears in the above-identified patent and that said Letters Patent are hereby corrected as shown below:

Column 10, Line 49

Delete "anoxic" and substitute therefore " an oxic"

Column 12, Line 12

Delete "anaerobic" and substitute therefore "aerobic"

Signed and Sealed this

Second Day of June 1981

[SEAL]

Attest:

RENE D. TEGTMEYER

Attesting Officer        Acting Commissioner of Patents and Trademarks